United States Patent [19]

Rassieur

[11] Patent Number: 4,576,498
[45] Date of Patent: Mar. 18, 1986

[54] ASSEMBLY STRUCTURE FOR A SOIL SAMPLER

[75] Inventor: Charles L. Rassieur, St. Louis County, Mo.

[73] Assignee: Central Mine Equipment, St. Louis, Mo.

[21] Appl. No.: 701,731

[22] Filed: Feb. 14, 1985

[51] Int. Cl.[4] ............................................. F16B 19/00
[52] U.S. Cl. ..................................... 403/24; 403/299; 403/324; 403/379; 175/20; 411/347
[58] Field of Search ..................... 175/20, 21, 22, 23, 175/405; 403/378, 379, 324, 24, 299; 411/347, 348

[56] References Cited

U.S. PATENT DOCUMENTS

| | | | |
|---|---|---|---|
| 1,456,983 | 5/1923 | Hansen | 175/173 |
| 2,515,807 | 7/1950 | Spooner | 411/348 |
| 2,872,227 | 2/1959 | Wachs | 403/379 |
| 4,081,040 | 3/1978 | Henson | 175/246 X |

*Primary Examiner*—Andrew V. Kundrat
*Attorney, Agent, or Firm*—Polster, Polster and Lucchesi

[57] ABSTRACT

In an exploration type drill rig, an improved assembly arrangement for a soil sampling tube and head support therefor including nesting, aperture-aligned tubular wall sections of the sampling tube and head support with a pin extending through aligned apertures and held in position by a spaced stop and movable detent extending radially from the pin on opposite sides of the nesting tubular walls.

8 Claims, 4 Drawing Figures

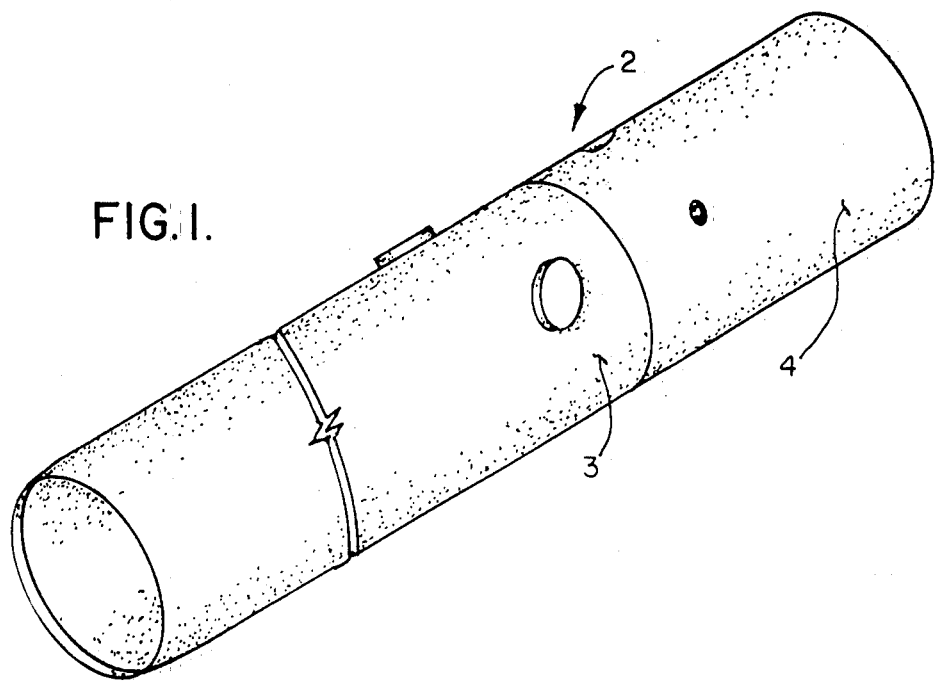
FIG. 1.
FIG. 3.
FIG. 2.
FIG. 4.
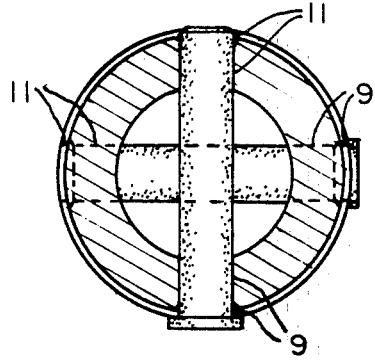
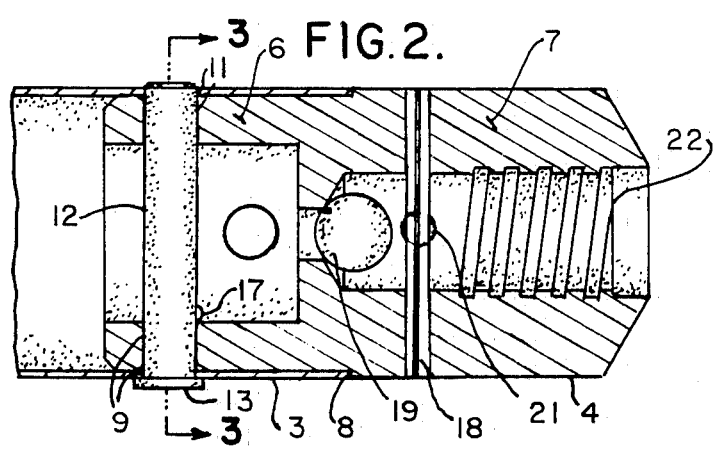
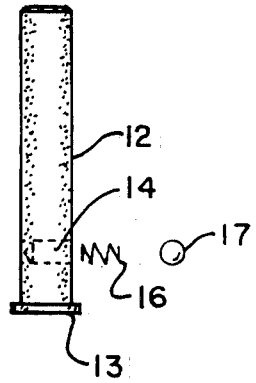

ASSEMBLY STRUCTURE FOR A SOIL SAMPLER

BACKGROUND OF THE INVENTION

In soil-sampling tools for retrieving soil samples at the bottom of a bored hole, it is known to fasten the sampling tube to a head support which, in turn, is supported through connecting drill rods to the ground surface. The sample tube is pushed into the soil at the bottom of the hole by applying a downward pressure on the connecting rods.

A number of fastening arrangements have been utilized to assemble the soil sampling tube to the head support. Among early arrangements, such as that disclosed in U.S. Pat. No. 1,456,983, issued to Charles C. Hansen on May 29, 1923, the sampling tube has been connected through a pin mounted on the head support which engaged in bayonet joint fashion with a slot in the tube. In more recent arrangements, such as that disclosed in U.S. Pat. No. 4,081,040, issued to William P. Henson on Mar. 28, 1978, the sampling tube has been connected to the head support through a plurality of cap screws. These past arrangements have had disadvantages in manufacture, assembly operation and wear. For example, with bayonet slot arrangements, slot cutting of the tube and pin mounting to the head support has been comparatively complex in manufacture and in assembly and disassembly. Cap screws have required threading holes in the head support. The inserting, screwing and unscrewing the cap screws for assembly and disassembly of the several parts is time consuming. The cap screws tend to be lost or misplaced, because they are relatively small and four have been required. Furthermore, soil has tended to clog the threaded holes and to get into the threads on the cap screws, so that the cap screws either bind in the holes or at least the holes and screws have to be cleaned before the cap screws are inserted.

The present invention, recognizing these past disadvantages, provides an improved, straightforward assembly structure for a soil sampling tube and head support therefor which avoids the use of previously required small and difficult to handle parts and which is both economical and relatively easy to manufacture, fast and easy to assemble and disassemble, and easy to maintain. Various other features of the present invention will become obvious to one skilled in the art upon reading the disclosure set forth herein.

SUMMARY OF THE INVENTION

In accordance with this invention, generally stated, an improved assembly structure for a soil sampler is provided comprising a soil sampling tube and a head support therefor, the head support having an apertured tubular wall lower section and the sampling tube having an apertured tubular wall upper section, the tubular walls being sized to nest in male-female relation with the apertures thereof in alignment; and pin means removably extending through the aligned apertures, the pin means including a stop member and a movably mounted detent axially spaced therefrom a sufficient distance to position the snugly nesting walls therebetween to maintain the pin means in position. It is to be understood that various changes can be made in the arrangement, form and construction of the assembly described herein without departing from the scope or spirit of the present invention. For example, the detent utilized, as well as the size and conformation of pin and aperture can be changed without departing from the present invention.

BRIEF DESCRIPTION OF THE DRAWINGS

Referring to the drawing which discloses one advantageous embodiment of the present invention:

FIG. 1 is a broken, isometric view of a head support and sampling tube in overall assembled relation;

FIG. 2 is an enlarged cross-sectional view of a portion of the head support and sampling tube of FIG. 1;

FIG. 3 is a cross-sectional view taken in a plane through line 3—3 of FIG. 2; and FIG. 4 is a plan view of one of the pins for the assembly of FIGS. 1–3, disclosing the parts of a resiliently mounted detent in exploded form.

Referring to FIG. 1 of the drawing, the improved assembly structure broadly referred to by reference numeral 2, includes a thin-walled soil sampling tube 3 and head support 4 therefor. As can be seen more clearly in FIG. 2, head support 4 is comprised of a tubular wall lower section 6, integral with and extending from an upper section 7 of the head support 4. It is to be noted that the outer peripheral wall of lower section 6 is of lesser diameter than upper section 7 so as to provide an abutment shoulder 8 therebetween to receive the upper edge of sampling tube 3 thereagainst. Sampling tube 3 and the lower section 6 of head support 4 are sized to permit snug nesting in male-female relation of the two parts with the edge of tube 3 abutting shoulder 8 as above noted.

Each of the nesting tubular walls of tube 3 and head support 4 is provided with at least two pairs of opposed apertures 9 and 11 (FIGS. 2 and 3) with the apertures of one pair being offset axially from the apertures of the other pair a distance greater than the diameter of the pins 12. As can be seen in FIG. 3, the apertures of one pair are oriented 90° from the apertures of the other pair, the apertures in upper section of soil sampling tube 3 and the lower section 6 of head support 4 being so positioned as to cause the corresponding apertures to be aligned when the tubular walls are in male-female nesting relation.

With the opposed aperture pairs 9 and 11 of the nesting, tubular walls properly aligned, pins 12 can be inserted therethrough to maintain the nesting tubes in position. As can be seen in FIG. 2, each pin 12 is of sufficient length to extend through all of the nesting tube aligned apertures in its plane. Each pin 12 also is of sufficient diameter to snugly pass through the aligned apertures in its plane and is provided at one extremity thereof with a head 13 which is sized radially of the pin to prevent pin 12 from passing through the apertures of the nesting tubular walls and axially of the pin to provide clearance between it and the inner wall of hollow stem augers or casings within which the sample tube must axially pass to the bottom of the hole. As can be seen in FIG. 4, pin 12 is provided with a radially extending well 14. Well 14 is spaced axially from head 13 a distance slightly greater than the thickness of the nesting tubular walls. Disposed within well 14 are spring 16 and ball 17 which together provide a spring loaded ball detent to maintain pin 12 in position when the pin is inserted through aligned apertures of the nesting walls. When the pin is inserted, the adjacent nesting wall portions are positioned between head 13 and detent 17. It is to be understood that suitable ball restraining means are provided at the mouth end of the well 14 to restrain the ball 17 within the well and yet permit a portion thereof to protrude beyond the outer periphery of pin 12 as a detent. Alternatively, a preassembled spring loaded detent cylinder, sized to snugly engage in well 14, can be utilized.

From the above, it can be seen that the improved assembly structure provides for economical and efficient manufacture, assembly operation, disassembly and maintenance, the disassembly operation being readily accomplished by applying suitable force on the extremity of pin 12 opposite head 13 to cam ball 17 inwardly against spring 16, allowing pin 12 to be slid from the aligned apertures in the nesting tubular walls. Although the upper section 7 of head support 4 is disclosed in FIG. 2 to include retaining spring pin 18, a one-way ball valve 19, and a suitable fluid outlet 21, all within internally threaded section 22 for mounting of head support 4 on a threaded extremity of a drill rod (not shown), it is to be understood that alternative stuctures can be utilized with the structure of the assembly.

It will be seen that because successive of the holes in the thin walled sampling tube are staggered lengthwise of the tube, the resistance of the tube to shear is increased over the conventional construction in which the apertures are aligned circumferentially. Furthermore, two, relatively large pins are used to provide at least as much support to the tube as the four conventional threaded studs, which require screwing in and out, a time consuming procedure. Also both the internal and external threads must be clean and they are more likely to be lost or misplaced.

Numerous variations in the construction of the device of this invention, within the scope of the appended claims, will occur to those skilled in the art in the light of the foregoing disclosure. Merely by way of example, the shape of the head can be varied, the type of detent can be varied, although the preferred example given has advantages of simplicity, ready availability and effectiveness, and the relative sizes of the holes can be varied, for example to permit the head of the pin to be recessed in whole or in part, although the construction described works well and is simple to make and use. The head can be eliminated entirely, and the pin positioned by the use of two detents, both positioned immediately inboard of the inner wall of the tube on diametrically opposite sides when the pin is in place. These are merely illustrative.

The invention claimed is:

1. An improved assembly structure for a soil sampler comprising: a soil sampling tube and a head support therefor, said head support having an apertured tubular wall lower section and said sampling tube having an apertured tubular wall upper section, said sections of said tubular walls being sized to nest in male-female relation with the apertures thereof in alignment said apertures providing a passage extending substantially diametrically and completely through said head support and sample tube, and pin means removably extending completely through said passage to engage said sample tube wall apertures on substantially diametric sides of said head support, said pin means including a stop member and a movably mounted detent axially spaced therefrom a sufficient distance to position nesting walls of the head support and sample tube therebetween to maintain said pin means in position.

2. The apparatus of claim 1, each of said nesting tubular walls having apertures in axially different planes disposed to be respectively aligned when said tubular walls are in nesting relation with said pin means extending through aligned apertures in axially staggered relation to one another.

3. The apparatus of claim 1, each of said nesting tubular walls having at least two pairs of opposed apertures with the apertures of one pair being in an axially different plane from the apertures of the other pair and disposed in similarly offset radial relation to be respectively aligned when said tubular walls are in nesting relation, said pin means including pins for insertion in aligned apertures of each plane, each pin being of sufficient length to extend through all of said apertures of its plane when so aligned with each pin including a stop member and a resiliently mounted detent axially spaced therefrom a sufficient distance to position the snugly nesting walls therebetween and maintain said pin in position.

4. The apparatus of claim 1, said stop member on said pin means comprising a head at one end of said pin means sized to prevent the pin from passing through the apertured tubular walls and to clear the inner surface of a drill string within which the sample tube passes through.

5. The apparatus of claim 1, said movably mounted detent including a spring loaded ball in a radially extending well in said pin means axially disposed from said stop member.

6. An improved assembly structure for a soil sampler comprising a soil sampling tube and a head support therefor, said head support having a tubular wall lower section extending from the upper section thereof in recessed fashion to provide an abutment shoulder therebetween and said sampling tube having a tubular wall upper section sized to slidably nest in snug male-female relation with said tubular wall lower section of said head support with the extremity of said upper section engaging said abutment shoulder; each of said nesting tubular walls having at least two pairs of opposed apertures with the apertures of one pair being in an axially different plane from the apertures of the other pair and disposed similarly in offset radial relation to be respectively aligned when said tubular walls are in nesting relation; and pins having detents therein inserted in aligned apertures of each plane, each pin being of sufficient length to extend through all of said apertures of its plane.

7. The apparatus of claim 6, each of said pins having a head at one extremity thereof sized to prevent the pin from passing through said apertured tubular walls and to provide clearance between said head and the inner wall of a drill string within which said sample tube is positioned and a radially extending well therein spaced from said head a distance slightly greater than the thickness of said nesting walls, said well having a spring loaded ball detent mounted therein to maintain said pin in position when inserted through the aligned apertures of said nesting walls.

8. The apparatus of claim 6, the opposed apertures in one plane being in 90° offset radial relation to the opposed apertures in the other plane.

* * * * *